(12) United States Patent
Olmi et al.

(10) Patent No.: US 8,123,167 B2
(45) Date of Patent: Feb. 28, 2012

(54) IMPACT RESISTANT AIRCRAFT LEADING EDGE STRUCTURES AND AIRCRAFT INCLUDING THE SAME

(75) Inventors: Franco Olmi, São José dos Campos-SP (BR); Luiz André Romariz, São José dos Campos-SP (BR)

(73) Assignee: Embraer S.A., São José Dos Campos - SP (BR)

( * ) Notice: Subject to any disclaimer, the term of this patent is extended or adjusted under 35 U.S.C. 154(b) by 508 days.

(21) Appl. No.: 12/335,524

(22) Filed: Dec. 15, 2008

(65) Prior Publication Data

US 2010/0148006 A1 Jun. 17, 2010

(51) Int. Cl.
*B64C 23/00* (2006.01)
*B64C 3/00* (2006.01)

(52) U.S. Cl. ........................ 244/121; 244/123.1; 244/133

(58) Field of Classification Search ............... 244/123.1, 244/123.14, 123.2, 123.4, 123.8, 133, 121, 244/87, 89, 91, 213, 214
See application file for complete search history.

(56) References Cited

U.S. PATENT DOCUMENTS

| | | | | |
|---|---|---|---|---|
| 4,298,417 A | * | 11/1981 | Euler et al. | 156/228 |
| 4,485,991 A | * | 12/1984 | Fuller | 244/49 |
| 4,657,615 A | * | 4/1987 | Braun et al. | 156/245 |
| 2007/0057123 A1 | * | 3/2007 | Gahete et al. | 244/123.1 |
| 2007/0138340 A1 | | 6/2007 | Arafat et al. | |
| 2008/0258009 A1 | * | 10/2008 | Alvarez | 244/133 |
| 2009/0010765 A1 | * | 1/2009 | Propheter-Hinckley et al. | 416/97 R |
| 2009/0127392 A1 | * | 5/2009 | Gross et al. | 244/121 |

FOREIGN PATENT DOCUMENTS

WO WO 2007/071398 A1 6/2007

* cited by examiner

*Primary Examiner* — Milton Nelson, Jr.
(74) *Attorney, Agent, or Firm* — Nixon & Vanderhye P.C.

(57) ABSTRACT

Aircraft empennage structures have impact resistance satisfying transport aircraft certification requirements (for example, FAR part 25 and/or other international certification requirements). The structures may be specifically embodied in leading edge structures that are preferably in the form of one-piece components formed from fiber-reinforced composite materials (e.g., reinforcement fibers such as glass fibers, aramid fibers and/or carbon fibers embedded in a polymeric matrix such as an epoxy resin). The leading edge structures will most preferably include an arcuate skin and longitudinally extending internal reinforcement which is generally Y-shaped and includes a planar rib element and a pair of planar divergent reinforcement arms. The rib element may be positioned so as to be coplanar with a longitudinal bisecting plane of the leading edge structure. A forward end of the rib element may thus be integrally attached aft of an apical end of the skin, whereas an aft end of the rib may be integrally attached to each of the reinforcement arms. According to certain embodiments, rigidity and thus impact resistance may be facilitated by providing the apical end of the skin with a greater cross-sectional thickness as compared to the attachment ends of the skin.

15 Claims, 3 Drawing Sheets

IMPACT RESISTANT AIRCRAFT LEADING EDGE STRUCTURES AND AIRCRAFT INCLUDING THE SAME

FIELD

The disclosed structures relate generally to aircraft having impact resistant leading edges.

BACKGROUND

Airworthiness certification requirements for transport category aircraft under Part 25 of the US Federal Aviation Regulations (FARs, 14 CFR) and other equivalent international certification requirements typically require that aircraft structures withstand certain in-flight impacts, such as bird strikes, without experiencing airframe failure so that the aircraft can continue the flight and land safely. Components such as empennage leading edges (e.g., wings as well as horizontal and vertical stabilizers) are particularly critical components of the airframe. Thus, in order to comply with specific discrete source damage certification requirements of FAR Part 25 (incorporated hereinto by reference), the aircraft must withstand the impact of birds weighting 4 pounds (FAR §25.571 [e][1]) and 8 pounds (FAR §25.631).

In order to assure structural integrity of the empennage structure (as described in FAR §25.631, for example), one common engineering design has been to include an additional device colloquially called a "splitter plate" physically inside the leading edge which is attached rigidly to the empennage primary (spar) structure. In such a situation, the splitter plate is physically spaced from the leading edge so that if the leading edge collapses on impact with a bird in flight, the splitter plate will absorb the impact energy by splintering the bird thereby protecting the empennage primary structure. This traditional option of providing a splitter plate in operative association with empennage leading edges works effectively, but extracts a substantial weight penalty as the splitter plate is usually in the form of a rigid structural component made from metal (e.g., aluminum or steel).

Other proposals have been made to provide impact resistant to aircraft leading edges. For example, one prior proposal has been made in International Patent Publication WO 2007/07138 (incorporated hereinto by reference) wherein an arcuate protective skin is provided which is formed of glass-fiber reinforced aluminum material that may optionally include a series of spaced apart rib stiffeners. US Patent Application Publication 2007/0138340 (incorporated hereinto by reference) proposes to provide a protective skin forming the leading edges of an aircraft structure which is chemically etched and/or mechanically milled in oval and rectangular patterns so as to create crumple zones to generate progressive failure of the metal upon an in-flight impact with an object.

SUMMARY OF EXEMPLARY EMBODIMENTS

Broadly, preferred embodiments are provided in the form of aircraft leading edge structures which have impact resistance according to international certification requirements (for example, FAR Part 25). Preferably, the leading edge structures are in the form of a one-piece component formed from fiber-reinforced composite materials. The leading edge structures will most preferably include an arcuate skin and longitudinally extending internal reinforcement.

The internal reinforcement is most preferably generally Y-shaped and includes a planar rib element and a pair of planar divergent reinforcement arms. In especially preferred embodiments, the rib element is coplanar with a longitudinal bisecting plane of the leading edge structure. A forward end of the rib element may thus be integrally attached aft of an apical end of the skin, whereas an aft end of the rib may be integrally attached to each of the reinforcement arms. According to certain embodiments, rigidity and thus impact resistance may be facilitated by providing the apical end of the skin with a greater cross-sectional thickness as compared to the attachment ends of the skin.

The fiber-reinforced composite material from which embodiments of the leading edge structure may be fabricated includes one or more types of reinforcement fibers selected from the group consisting of glass fibers, aramid fibers and carbon fibers. Preferably, the composite material includes glass fibers embedded in an epoxy resin. The composite material is also preferably electrically non-conductive so as to facilitate the mounting of antenna and/or other components requiring electrical isolation.

The impact resistant leading edges embodied by the present invention promote greater ease of aircraft structural repair following an in-flight bird strike or similar structural impact incident since the number of airframe parts requiring replacement is significantly reduced.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
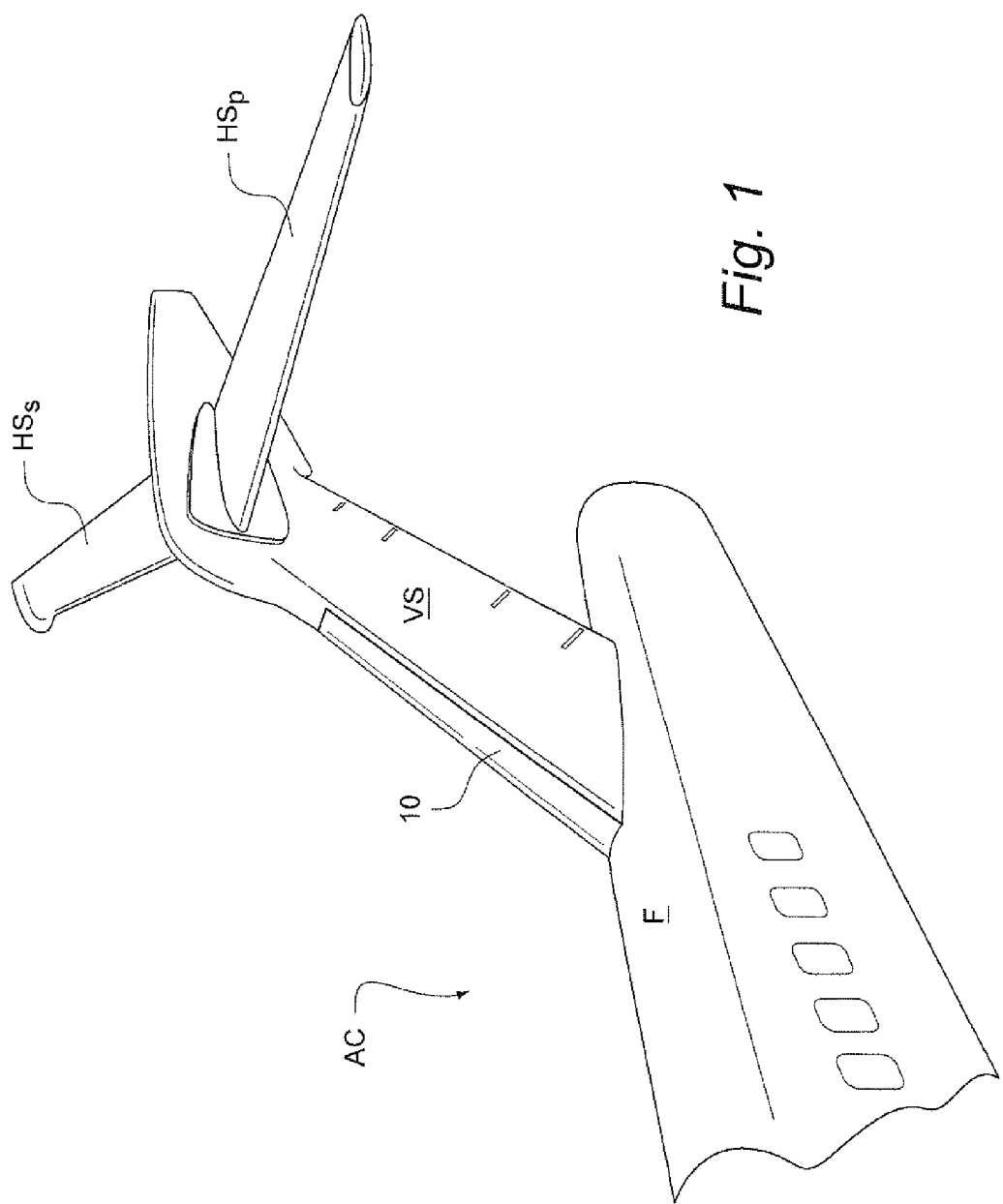
FIG. 1 is a partial perspective view of an aircraft tail section showing a representative location of an impact resistant leading edge according to one embodiment of the present invention.

Accompanying FIG. 1 depicts a rear portion of an aircraft AC including the aircraft fuselage F, a vertical stabilizer VS and port and starboard horizontal stabilizers HSp and HSs, respectively. As an exemplary depiction, an impact resistant leading edge structure 10 is installed on the vertical stabilizer VS. It will of course be understood that the impact resistant leading edge structure 10 could similarly be installed on the horizontal stabilizers HSp, HSs as well as on wings and, if provided, canard elements (not shown).

Figure 2:
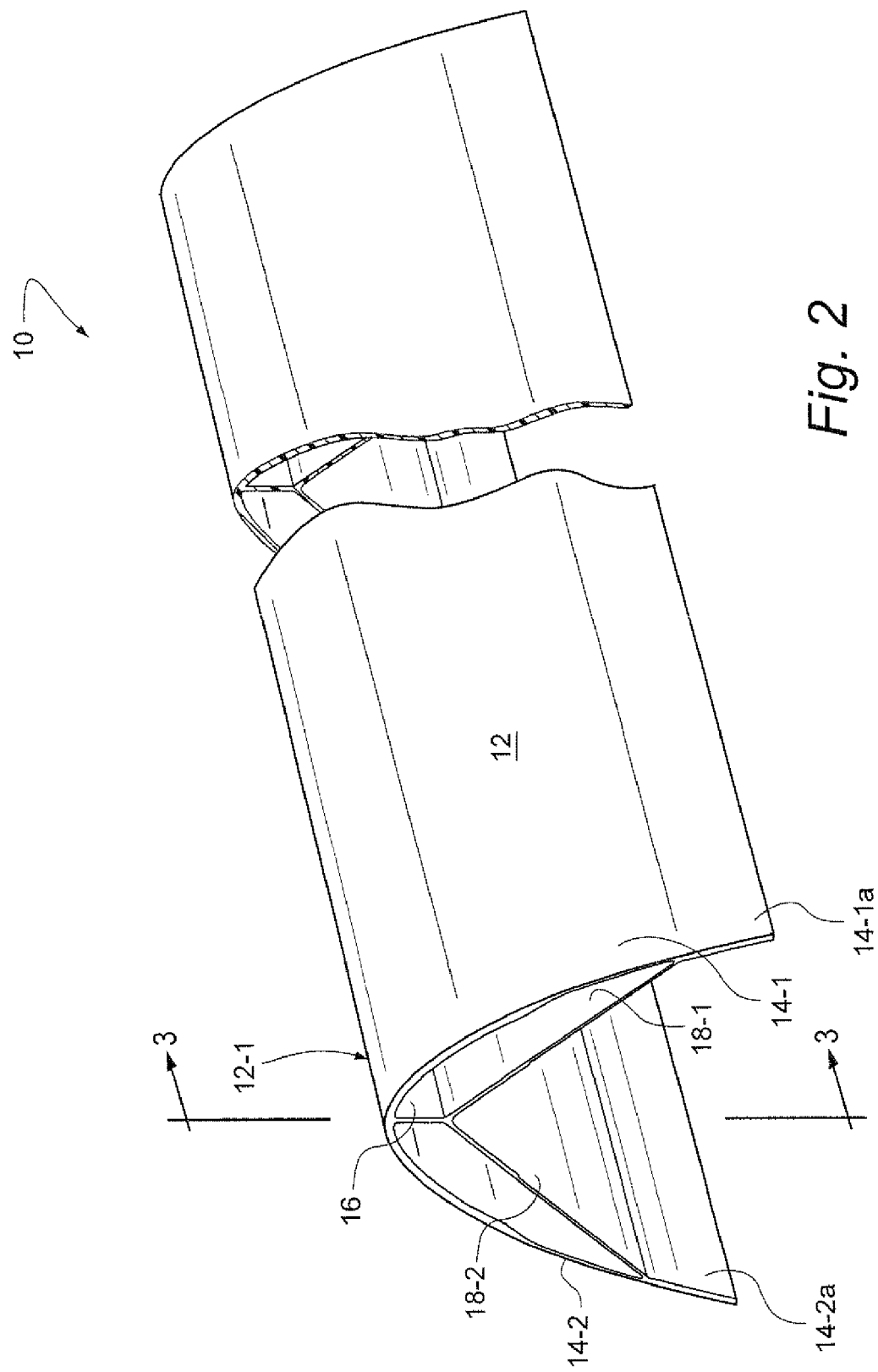
FIG. 2 is a disembodied perspective view of the impact resistant leading edge shown in FIG. 1.
Figure 3:
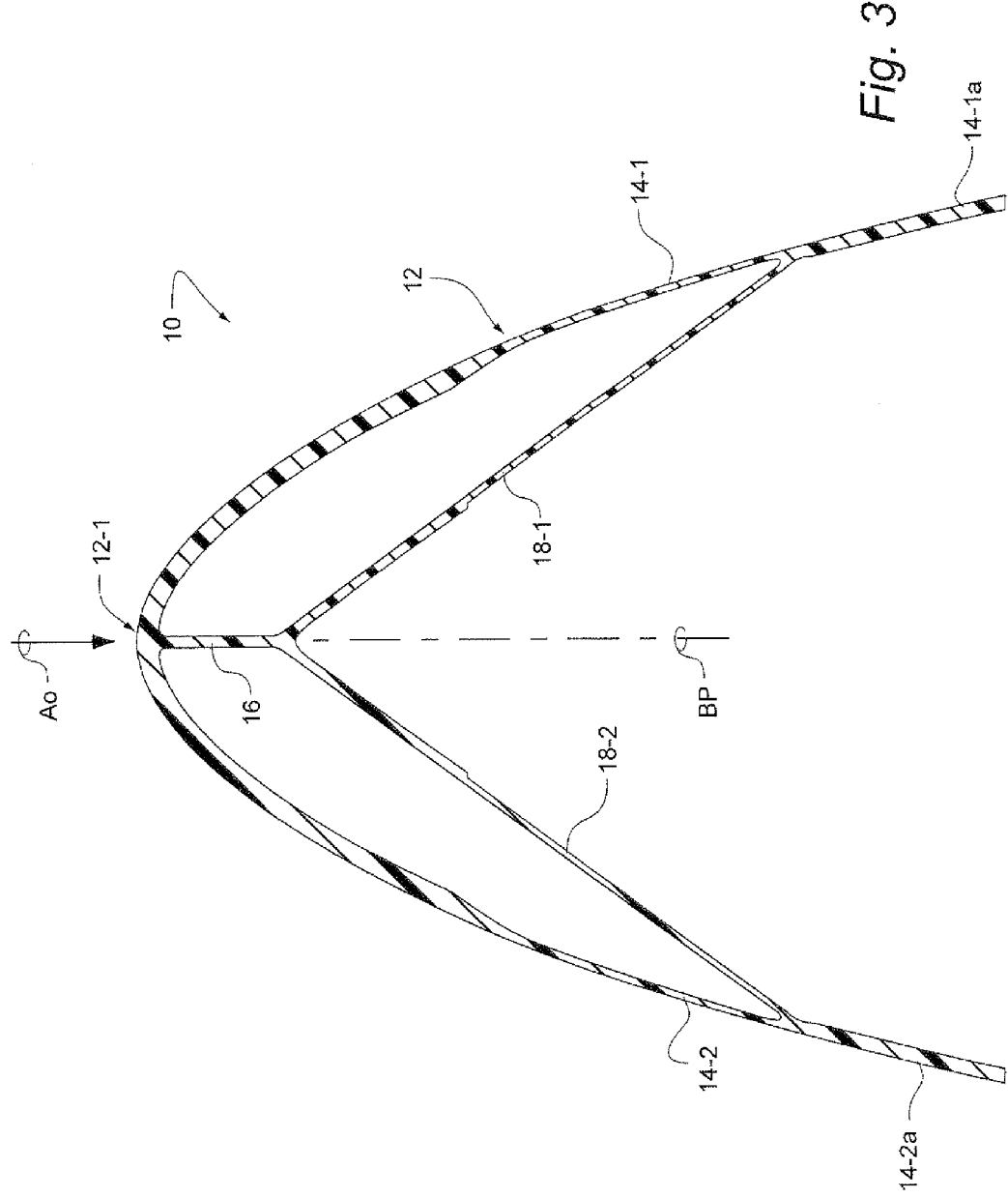
FIG. 3 is an enlarged cross-sectional elevational view of the impact resistant leading edge as taken along line 3-3 in FIG. 2.

As is perhaps more clearly shown in FIGS. 2 and 3, the impact resistant leading edge structure 10 includes an arcuately shaped outer skin 12 having an apical forward end 12-1 which structurally confronts the opposite direction of oncoming objects when the aircraft AC is in flight (noted by the arrow Ao in FIG. 3). Skin segments 14-1, 14-2 extend arcuately from the apical end 12-1 and terminate in a respective pair of laterally spaced attachment ends 14-1a, 14-2a. These attachment ends 14-1a, 14-2a serve to physically attach the leading edge structure 10 to the aircraft structure it is designed to protect (which in the illustrated embodiment is the vertical stabilizer VS).

The leading edge structure 10 includes a generally Y-shaped internal structural reinforcement which extends continuously within its entire longitudinal length. Specifically, the leading edge structure 10 most preferably is provided by an internal reinforcement rib element 16 and a pair of reinforcement arms 18-1, 18-2. The rib element 16 is most preferably a planar structural element which is positioned immediately aft of the apical end 12-1 of skin 12 along the longitudinal bisecting plane BP thereof (see FIG. 3). As such the forward end of the rib element 16 is integrated with the skin 12 immediately aft of the apical end 12-1. The planar reinforcement arms 18-1, 18-2 thus extend from the aft end of the rib element 16 in divergent directions to the attachment ends 14-1a, 14-2a, respectively, of the skin segments 14-1, 14-2. In such a manner, the rib element 16 and the reinforcement arms 18-1, 18-2 are integrally attached to one another and to the skin 12 to form a one-piece structure.

As noted briefly above, the impact resistant leading edge structure 10 is most preferably formed as an integral (one-piece) structural component from fiber-reinforced composite materials having relatively high strength-to-weight and stiffness-to-weight ratios. Composite materials are generally described as being materials that include one or more types of reinforcing fibers, such as glass fibers, aramid fibers (e.g., KEVLAR® Brand aramid fibers), carbon fibers and the like, embedded in a polymeric matrix, such as an epoxy resin. Preferred for the embodiments of the present invention are glass fibers. The components of the leading edge structure 10 as discussed previously may thus be formed into an integrated structure by laminating and co-curing of the fiber reinforced composite materials.

It will be further observed, for example in FIG. 3, that the apical end 12-1 of the skin 12 has a greater cross-sectional thickness of the composite material as compared to the attachment ends 12-1a, 12-2a. Furthermore, the forward sections of the reinforcement arms 18-1, 18-2 have a greater cross-sectional thickness of the composite material as compared to aft sections thereof, but is of a comparable cross-sectional thickness as compared to the rib 16. This greater cross-sectional thicknesses of the components therefore contributes to greater rigidity and hence impact resistance properties.

The composite materials from which the leading edge 10 is constructed are most preferably electrically non-conductive so as to allow the installation therewithin of high frequency (HF) antennas or other avionics related components requiring electrical isolation.

In addition to being able to withstand bird strikes to comply with the FARs and other equivalent international certification requirements, the leading edge structures of the present invention exhibit lighter weight as compared to conventional splitter plates. Furthermore, since the leading edge structures 10 are in the form of a one-piece component, the assembly onto the aircraft is simplified.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An impact-resistant aircraft leading edge structure comprising:
    an arcuate skin and a longitudinally extending internal reinforcement integrated together as a one-piece component formed of a fiber-reinforced composite material, wherein
    the skin has an apical end and a pair of attachment ends, and wherein the apical end has a greater cross-sectional thickness as compared to the attachment ends; and wherein
    the longitudinally extending internal reinforcement includes a planar rib element and a pair of planar divergent reinforcement arms, wherein forward sections of the reinforcement arms have a greater cross-sectional thickness as compared to aft sections thereof.

2. An impact-resistant aircraft leading edge structure as in claim 1, wherein the fiber-reinforced composite material includes one or more types of reinforcement fibers selected from the group consisting of glass fibers, aramid fibers and carbon fibers.

3. An impact-resistant aircraft leading edge structure as in claim 1, wherein the fiber-reinforced composite material includes glass fibers embedded in an epoxy resin.

4. An impact-resistant aircraft leading edge structure as in claim 1, wherein the composite material is electrically non-conductive.

5. An impact resistant aircraft leading edge structure as in claim 1, wherein a forward end of the rib element is integrally attached aft of the apical end of the skin, and wherein an aft end of the rib element is integrally attached to each of the reinforcement arms.

6. An impact-resistant aircraft leading edge structure as in claim 1 or 5, wherein the rib element is positioned so as to be coplanar with a longitudinal bisecting plane of the leading edge structure.

7. An aircraft leading edge structure comprising:
    an arcuate skin having an apical end and a pair of attachment ends, wherein the apical end has a greater cross-sectional thickness as compared to the attachment ends; and
    a generally Y-shaped longitudinally extending internal reinforcement integrally attached to the skin, wherein
    the longitudinally extending internal reinforcement includes a planar rib element and a pair of planar divergent reinforcement arms, wherein forward sections of the reinforcement arms have a greater cross-sectional thickness as compared to aft sections thereof.

8. An aircraft leading edge structure as in claim 7, wherein the skin and the Y-shaped internal reinforcement are formed as a one-piece component from a fiber-reinforced composite material which includes one or more types of reinforcement fibers selected from the group consisting of glass fibers, aramid fibers and carbon fibers.

9. An aircraft leading edge structure as in claim 7 which is formed as a one-piece component from a fiber-reinforced composite material.

10. An aircraft leading edge structure as in claim 9, wherein the composite material is electrically non-conductive.

11. An aircraft leading edge structure as in claim 7, wherein a forward end of the rib element is integrally attached aft of the apical end of the skin, and wherein an aft end of the rib element is integrally attached to each of the reinforcement arms.

12. An aircraft leading edge structure as in claim 7 or 11, wherein the rib element is positioned so as to be coplanar with a longitudinal bisecting plane of the leading edge structure.

13. An aircraft leading edge structure as in claim 1 or 7 which has impact resistance according to requirements of Part 25 FAR and/or other international transport aircraft certification requirements.

14. An aircraft which includes at least one aircraft leading edge structure according to claim 1 or 7.

15. A method of providing impact resistance to an aircraft, comprising installing on a leading edge of the aircraft a leading edge structure as in claim 1 or 7.

* * * * *